United States Patent [19]
Pepper

[11] Patent Number: 6,005,934
[45] Date of Patent: *Dec. 21, 1999

[54] SIMULATING CHANGES IN TELEPHONE SUBSCRIBER LINE

[75] Inventor: David Arnold Pepper, Rideau Township, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/772,673

[22] Filed: Dec. 20, 1996

[30] Foreign Application Priority Data

Oct. 25, 1996 [CA] Canada .................................. 2188844

[51] Int. Cl.⁶ .................................................. H04M 1/64
[52] U.S. Cl. .......................... 379/398; 379/399; 379/418; 455/426
[58] Field of Search .................................. 379/58, 93.09, 379/161, 164, 377, 382, 387, 393, 399, 413, 398; 455/402, 417, 426, 462

[56] References Cited

U.S. PATENT DOCUMENTS

| | | |
|---|---|---|
| 4,396,805 | 8/1983 | Wagner . |
| 4,658,096 | 4/1987 | West, Jr. et al. ........................... 379/59 |
| 4,712,233 | 12/1987 | Kuo . |
| 4,718,080 | 1/1988 | Serrano et al. ........................... 379/59 |
| 4,737,975 | 4/1988 | Shafer ..................................... 379/58 |
| 4,775,997 | 10/1988 | West, Jr. et al. ........................... 379/58 |
| 4,922,517 | 5/1990 | West, Jr. et al. ........................... 379/58 |
| 4,959,851 | 9/1990 | Tobolski, Jr. et al. ..................... 379/59 |
| 5,117,450 | 5/1992 | Joglekar et al. ........................... 379/58 |
| 5,140,631 | 8/1992 | Stahl ...................................... 379/377 |
| 5,287,404 | 2/1994 | Pepper et al. ............................. 379/377 |
| 5,404,491 | 4/1995 | Huzenlaub et al. . |
| 5,422,949 | 6/1995 | Tsukagoshi .............................. 379/399 |
| 5,483,576 | 1/1996 | Staples ..................................... 379/58 |
| 5,515,434 | 5/1996 | Cotreau .................................... 379/399 |
| 5,521,974 | 5/1996 | Hayashi et al. .......................... 379/381 |
| 5,535,265 | 7/1996 | Suwandhaputra .................... 379/93.09 |
| 5,544,241 | 8/1996 | Dibner et al. ........................... 379/373 |
| 5,619,567 | 4/1997 | Apfel ..................................... 379/413 |
| 5,694,465 | 12/1997 | Apfel ..................................... 379/377 |
| 5,706,336 | 1/1998 | Kikinis ................................. 379/93.01 |

FOREIGN PATENT DOCUMENTS

| | | |
|---|---|---|
| 0 476 755 A2 | 5/1992 | European Pat. Off. . |
| WO 96/25804 | 8/1996 | WIPO . |
| WO 96/32824 | 10/1996 | WIPO . |

OTHER PUBLICATIONS

"MH88500, Hybrid Subscriber Line Interface (SLIC)" Preliminary Information, Issue 5, Apr. 1995.

Goodenough, F.: "Slic Ejects Relays From PABX Line Cards", Electronic Design, vol. 42, No. 14, Jul. 11, 1994, pp. 55–56, 58–59, 62–64.

Primary Examiner—Fan S. Tsang
Attorney, Agent, or Firm—Jeffrey M. Measures

[57] ABSTRACT

A fixed wireless access subscriber unit containing a wireless transceiver and a telephone subscriber line interface circuit which supports privacy and remote release of hold between the subscriber unit and extension telephones are disclosed. The subscriber unit detects when the primary handset, or an extension telephone set goes off-hook. In response the subscriber unit modifies the voltage and/or current characteristics on the telephone subscriber line which connects the extension sets to the subscriber unit in such a manner that extension sets connected to the telephone subscriber line will sense when the primary handset goes off-hook.

23 Claims, 7 Drawing Sheets

SIMULATING CHANGES IN TELEPHONE SUBSCRIBER LINE

FIELD OF THE INVENTION

This invention relates to the communication systems which provide analog telephony services via a two-wire analog subscriber line (hereafter referred to as telephone subscriber line), wherein said telephone subscriber line is not connected to a central office switch using the conventional two-wire analog telephone subscriber line interface. In particular, the invention is particularly suited for fixed wireless access applications which provide telephony services to conventional telephone devices via a wireless communications link.

BACKGROUND OF THE INVENTION

It is well known to connect two or more telephone sets, for example, in different rooms of a residence, to the same telephone subscriber line, thus enabling calls to be originated or terminated at each telephone set or permit two or more people in the residence to participate simultaneously in a telephone conversation via the telephone subscriber line. A disadvantage of such an arrangement is that the privacy of a person using a first telephone set may be lost due to another person taking a second telephone set, connected to the same telephone subscriber line, off-hook (lifting the handset). While in some circumstances a click may be audible to the person using the first telephone set when the second telephone is taken off-hook, this does not provide a convenient or reliable indication that privacy has been interrupted. Accordingly, it is desirable to provide a more reliable indication at one telephone set of the hook state of another telephone set connected to the same line.

Such an indication is also useful even when the first telephone set is on-hook, as it can then serve to indicate to a prospective user of this telephone set whether or not the telephone subscriber line is already in use by another person using one of the other telephone sets connected to this line.

Furthermore, it is desirable for a user of the first telephone set to be able to place this in a hold state during a telephone call, to go to a second telephone set connected to the same line to continue the call, and to have the first telephone set automatically release itself from the hold state when the second telephone set is taken off-hook. This is referred to as remote release from hold.

Prior art devices take advantage of the fact that a change in the voltage between the two wires of the telephone subscriber line can be detected and used to take an appropriate action, for example to provide an indication at a first telephone set whether another telephone on the same telephone subscriber line has gone off-hook or to effect a remote release of hold.

As an example of such a prior art device, the reader is directed to U.S. Pat. No. 5,287,404, issued Feb. 15, 1994, naming Pepper et al as inventors, the disclosure of which is hereby incorporated by reference.

Figure 1:
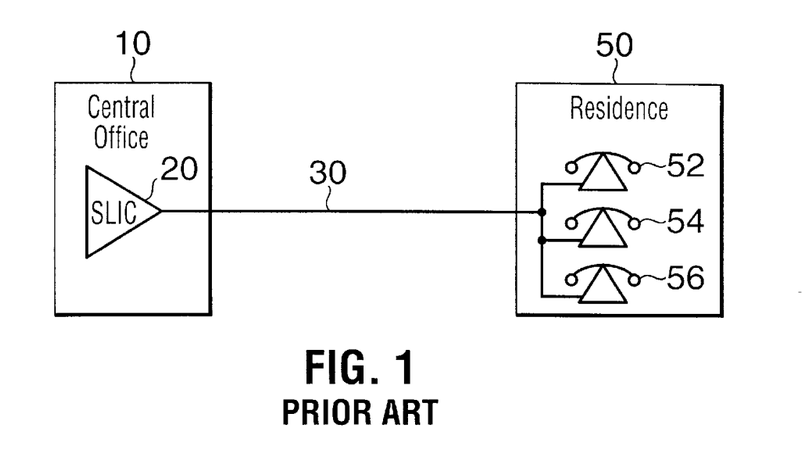
FIG. 1 is a schematic representation illustrating a prior art arrangement for providing telephony services.

FIG. 1 illustrates a prior art arrangement in which three telephones are shown connected to the same telephone subscriber line within a residence wherein said telephone subscriber line is directly connected to a central office using the conventional analog telephone subscriber line interface. In such a prior art arrangement, the central office 10 includes a subscriber line interface circuit (SLIC) 20 to which is attached telephones 52, 54 and 56, within the residence 50, via a telephone subscriber line 30. For example, let us assume that telephone set 52 contains a device for detecting changes in the voltage and current (VI) characteristic of the telephone subscriber line according to the prior art. If telephone set 56 goes off-hook, then set 52 can indicate to a user, for example, via a light, that set 56 has gone off-hook.

By way of example, let us assume that central office SLIC 20, using an open circuit voltage of 52 V, generates a potential of 52 volts between the two wires of the telephone subscriber line 30 when all telephone sets are on-hook. When telephone set 56 goes off-hook, telephone set 56 starts to draw current from the central office SLIC, via the telephone subscriber line, decreasing the voltage potential between the two wires to approximately 15 volts or less at the residence. The telephone set 52 senses this drop in potential which indicates that another extension connected to the telephone subscriber line has gone off-hook. Furthermore, if telephone 54 subsequently goes off-hook in parallel with telephone set 56, the current drawn from the central office SLIC by telephone 56 decreases, and if telephone set 56 also contains a device for detecting changes in the voltage and current characteristic of the telephone subscriber line, telephone 56 senses this drop in current or potential and indicates that another extension connected to the telephone subscriber line has gone off-hook.

While such features were designed for conventional (e.g. POTS) telephony service provided by a central office switch, it should be appreciated that other telephony services exist. For example, wireless (e.g. cellular) telephony has been proposed as a means of providing telephony services to a residence. In order to save costs associated with mobile cellular telephony, fixed wireless access (FWA) systems have been proposed. U.S. Pat. No. 4,658,096 naming West et al as inventor, describes an interface system for connecting a conventional telephone to a cellular transceiver. Such an interface system includes a SLIC for providing central office subscriber line interface features to a conventional telephone connected to the interface. However, there exists a need for providing more advanced features to such a system.

It is advantageous to add a handset (hereafter referred to as the primary handset), keypad, speaker, and display directly to the subscriber unit containing the SLIC. This transforms the subscriber unit into a wireless terminal which can also provide central office subscriber line interface features to additional conventional telephones via the built in SLIC. However, when this primary handset goes off-hook, there is no affect on the telephone subscriber line attached to the SLIC interface within the subscriber unit. Thus, a telephone set connected to the subscriber unit will not be able to detect the primary handset going off-hook. Therefore there exists a need for regulating the VI characteristics of the telephone subscriber line attached to the SLIC in the subscriber unit.

SUMMARY OF THE INVENTION

It is an object of the present invention to provide a subscriber unit for controlling a local telephone subscriber line which simulates the changes in the voltage and current characteristics of said telephone subscriber line which would normally occur when a telephony device, which is connected to a telephone subscriber line which is in turn connected to a central office, changes its on-hook status.

For example, one application is for a fixed wireless access subscriber unit, which communicates with a wireless network, for example, a conventional cellular network, for providing telephony services to conventional telephone sets.

These conventional telephone sets are connected to a telephone subscriber line which is connected to and controlled by the subscriber unit.

According to one embodiment, the subscriber unit also has a primary handset and acts as a terminal itself, as well as an interface for providing telephony services to the conventional telephone sets. The subscriber unit is adapted to detect the primary handset going off-hook, and simulate the changes in the voltage and current characteristics of the telephone subscriber line which occur when an extension telephone set connected to the telephone subscriber line goes off-hook. Therefore, all other extension sets can detect the change in the voltage and current characteristics on said telephone subscriber line and, if suitably equipped, indicate that the extension is in use to a potential user of that telephone set.

One aspect of the invention provides for a subscriber unit for providing telephony services to telephony devices on a telephone subscriber line coupled to said subscriber unit, said subscriber unit comprising at least one communication interface for communicating with a communications network via a suitable medium; a subscriber line interface circuit (SLIC); at least one jack coupling said telephone subscriber line to said SLIC; means for altering the voltage and current (VI) characteristics of said telephone subscriber line in response to a condition.

The present invention provides for such a subscriber unit which regulates VI characteristics generated by its SLIC in response to some condition. (For example, the primary handset going off-hook, or the subscriber unit entering a test mode.)

BRIEF DESCRIPTION OF THE DRAWINGS

The present invention, together with further objects and advantages thereof will be further understood from the following description of example embodiments with reference to the drawings in which.

DETAILED DESCRIPTION

The present invention will be described with respect to a preferred embodiment used in a fixed wireless access system. It should be appreciated by a person skilled in the art that the invention can also be utilized in other types of systems, for example, fiberoptic, cable TV, etc. which provide telephony services by some means other than a telephone subscriber line connected to a central office switch using the conventional two-wire analog telephone subscriber line interface.

Figure 2:
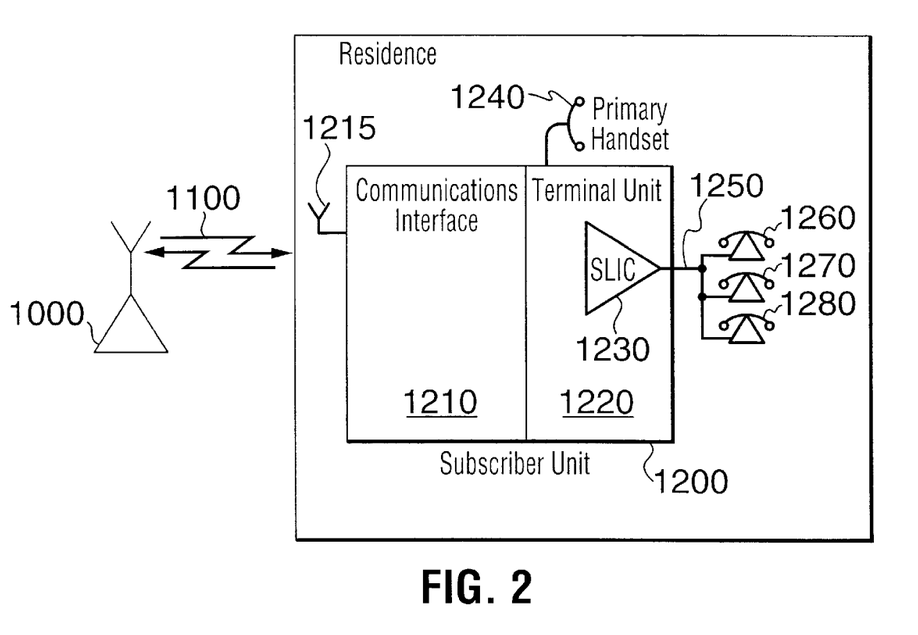
FIG. 2 is a schematic representation illustrating how a communication network can provide telephony services to conventional telephone sets according to a preferred embodiment of the present invention.

By way of example, FIG. 2 illustrates a communications network 1000 which, in this example, includes a wireless base station which communicates by a medium 1100, which in this example is a suitable radio frequency interface (e.g., IS54B), with a subscriber unit 1200. Subscriber unit 1200 includes a communication interface 1210 which communicates with the communication network 1000 via the medium 1100. In this example, communication interface 1210 comprises a radio transceiver and antenna 1215 for communicating using IS54B protocols with base station 1000. Subscriber unit 1200 also includes terminal unit 1220 which includes a primary handset 1240 and a SLIC 1230 which connects to telephone subscriber line 1250 which connects to telephones 1260, 1270 and 1280. Telephone subscriber line 1250 can include wiring within the residence, extension wires, or a combination thereof.

Figure 3:
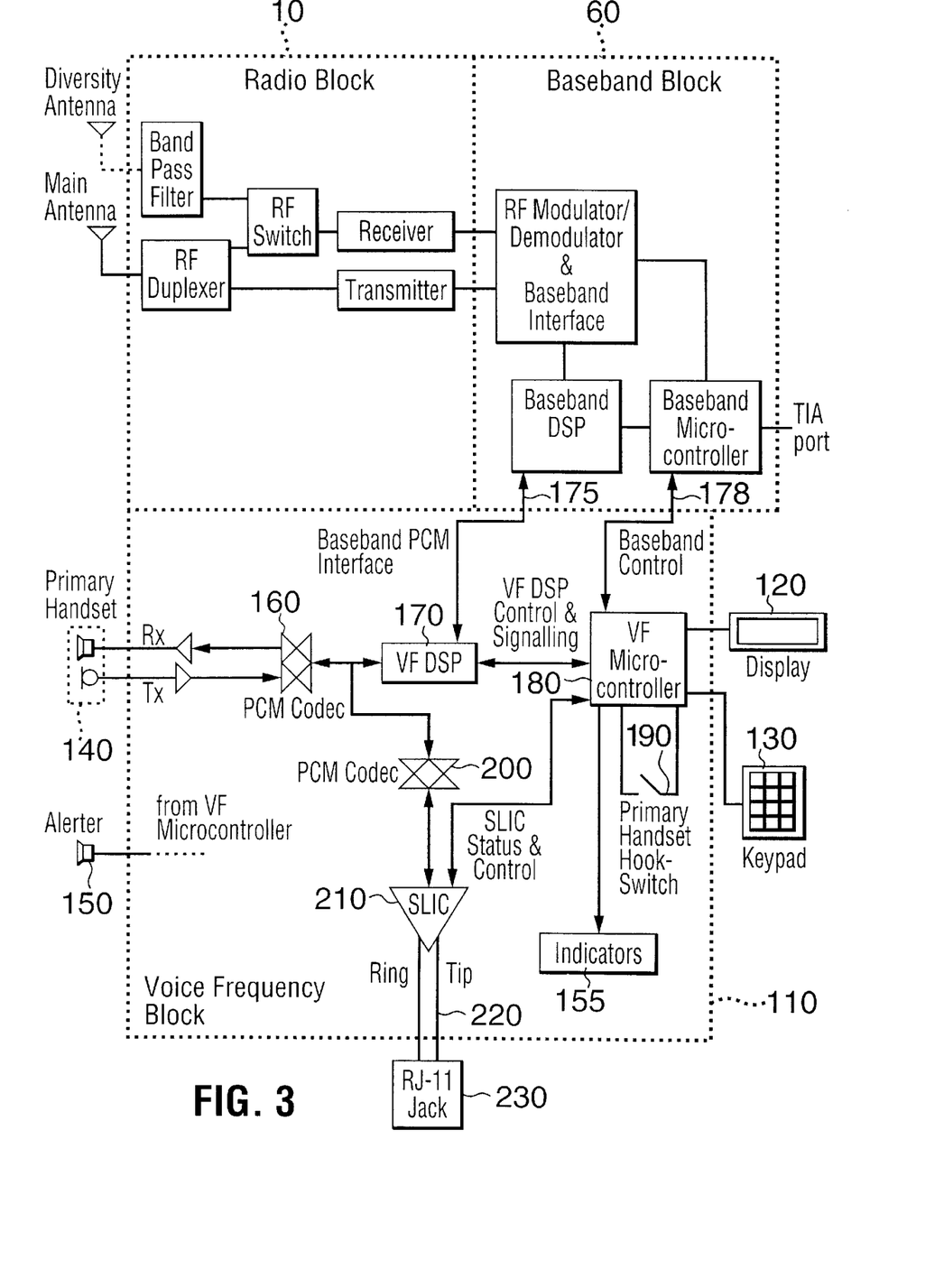
FIG. 3 is a block diagram showing the architecture of a subscriber unit according to a preferred embodiment of the invention.

An example of subscriber unit 1200 is shown in FIG. 3 wherein the communications interface is comprised of a radio block 10 and a baseband block 60. The subscriber unit also comprises a voice frequency block 110. There are two interfaces between the baseband block 60, and the voice frequency block 110. The first interface called the PCM interface 175 comprises the digitized voice frequency pulse code modulation (PCM) transmit and receive signals, while the second interface is a bi-directional serial communications interface 178. The radio block 10 and the baseband block 60 provide the conversion between the radio frequency and digitized voice frequency signals. The baseband block 60 is also responsible for handling the protocols associated with the RF link under the control of the voice frequency block 110.

The voice frequency block 110 includes a primary user interface which includes a display 120, a keypad 130, an alerter 150 which produces an audio alert (e.g., ringing) and an indicator 155 which provides visual alerts (e.g., a light indicator indicating, for example, that an extension is off-hook or that an incoming call has been received), and a primary handset 140. The voice frequency block 110 also includes a secondary user interface including RJ-11 jack 230 which acts as an extension jack for standard analog telephony devices. Note that an additional data jack can be supported.

Not shown is a suitable DC power source. This can comprise a battery, or a suitable AC power adapter, or preferably a combination of the two where ordinarily power is provided from an AC main with battery power as a backup.

The voice frequency (VF) microcontroller 180 controls call processing via input from the baseband block 60, the primary hook switch 190, the keypad 130, the VF DSP 170, and the subscriber line interface circuit (SLIC) 210. The VF microcontroller controls call processing via control of the baseband block 60, the display 120, the alerter 150, the VF DSP 170, and the SLIC 210. The VF microcontroller includes a microprocessor and associated memory. The Mitsubishi M37510 is a suitable microcontroller. The VF DSP 170 primarily provides the interface of the digitized voice frequency transmit and receive signals between two pulse code modulation (PCM) coder decoders (CODEC) 160 and 200 and the baseband PCM interface. The Analog Devices ADSP-2163 is a suitable DSP. PCM CODEC 160 provides suitable analog to digital and digital to analog conversion between the primary handset 140 and the VF DSP 170. Likewise, the PCM CODEC 200 provides suitable analog to digital and digital to analog conversion between the extension devices via the SLIC 210 and the VF DSP 170.

The SLIC 210, which for example can include an Advanced Micro Devices AM79R79 SLIC chip, provides central office subscriber line interface features to extension devices connected to the RJ-11 jack 230, via the tip and ring terminals. For example, the SLIC provides over-voltage protection, DC power (battery feed), the hybrid function (2 wire–4 wire interface), ringing voltage, supervision (off hook detection), etc.

In operation, when primary handset 140 is lifted by a user who wants to place a call, the VF microcontroller 180 will detect the primary hook switch 190 going off-hook. The microcontroller will in response send a control signal to the SLIC 210. This control signal will depend on the status of all extension telephones on the telephone subscriber line connected to extension jack 230, as detected by the VF microcontroller 180 from the SLIC 210 supervision output. Assuming all extension devices are on-hook, then the control signal causes the tip to ring terminals output voltage to drop to approximately 15 volts or less. The voltage is dependent on the country where the application is used. In North America 10 volts is suitable.

On the other hand, if the primary handset is off-hook and the SLIC 210 detects an extension device going off-hook, the SLIC 210 indicates this to the VF microcontroller 180. In response to this indication, the VF microcontroller sends different control signals to the SLIC. With an extension off-hook, the control signal decreases the current limit provided by the SLIC to approximately 10 mA, from the normal current limit of 20 to 30 mA provided to an extension phone when the primary handset is on-hook. By making these changes to the VI characteristic generated by the SLIC 210, the telephone subscriber line 1250, which connects to extension telephones 1260, 1270 and 1280, behaves in the same manner as if the primary handset 140 was also an extension telephone set connected to the telephone subscriber line 1250. In other words, the subscriber unit 1200 simulates the voltage and current (VI) characteristics on the telephone subscriber line 1250 as if the primary handset 140 was a conventional telephone device on the telephone subscriber line 1250.

It should be appreciated by a person skilled in the art that there are many ways of accomplishing the above described simulation. With further reference to FIG. 3, a preferred embodiment for accomplishing the above described simulation will now be described in more detail with reference to FIGS. 4 and 5. FIG. 4 is a flow diagram for the program executed within the VF microcontroller. FIG. 5 illustrates the appropriate hardware, which in conjunction with the microcontroller adjusts the telephone subscriber line's VI characteristics by controlling the SLIC in response to the status of the primary handset, the terminal's "Hold" key, and the SLIC supervision output. FIGS. 4 and 5 incorporate the information relevant to the present invention only. For example, FIG. 4 does not indicate when to enable dial tone, or when to collect DTMF digits, while FIG. 5 does not include the SLIC analog transmit and receive paths, the power ringing components, etc.

The VF microcontroller's input signals must be debounced by the VF microcontroller before the actions of the program described in the FIG. 4 flow diagram are executed. In this context debouncing implies the input signal must be continuously high or low for a certain period of time. In this embodiment, examples of such time periods include 100 ms, 10 ms, and 100 ms for the primary hook switch, the "Hold" key, and the SLIC supervision respectively. Preferably the VF microcontroller makes the state transition and sets the SLIC control as appropriate within 100 ms of reception of the debounced input. This time constraint provides for compatibility with extension telephones which monitor the telephone subscriber line. For example, if after an off-hook transition by an extension, there is a lengthy delay before adjusting the telephone subscriber line VI characteristic after the off-hook transition, the extension could interpret the transition incorrectly.

Figure 4A:
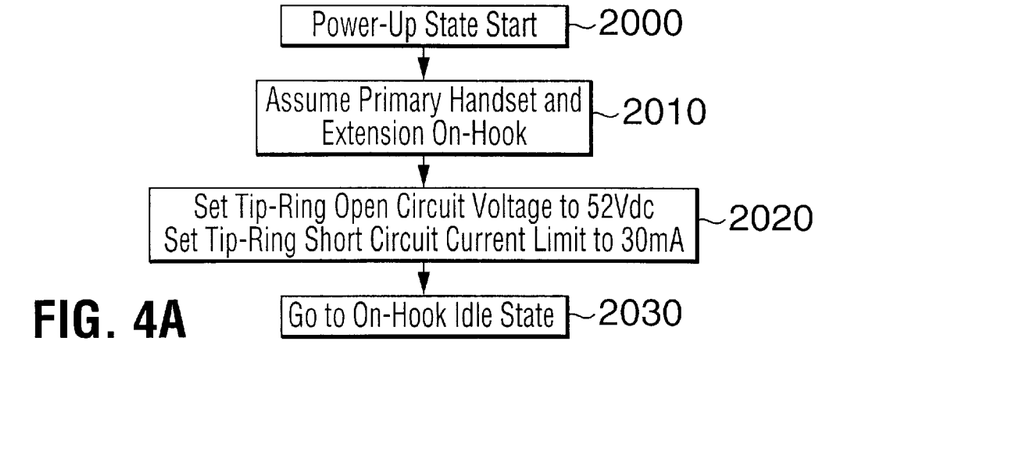
FIG. 4 is a series of flow diagrams illustrating the process carried out by the subscriber unit according to a preferred embodiment of the invention.
Figure 5:
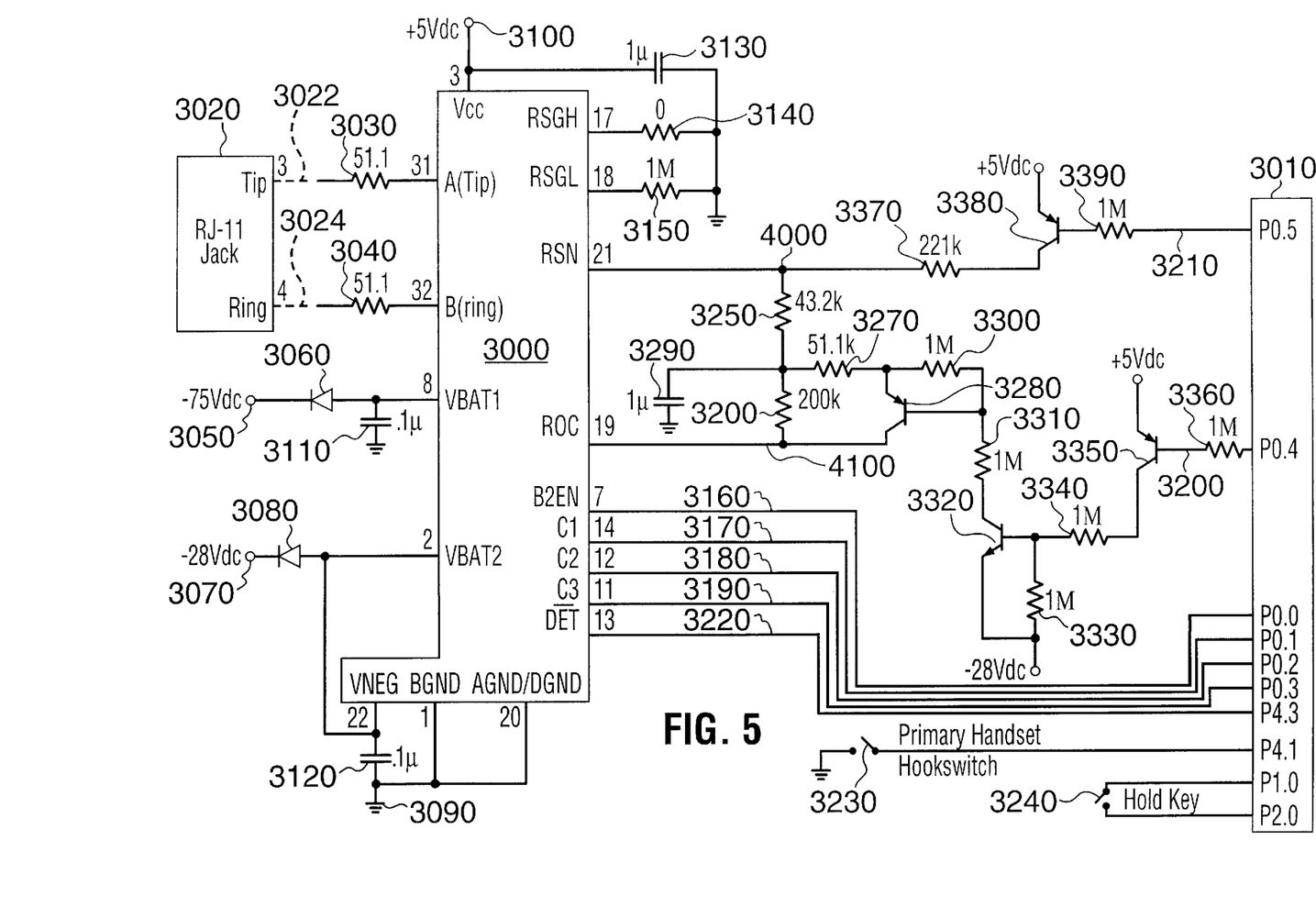
FIG. 5 is a circuit diagram illustrating more details of a portion of the subscriber unit according to a preferred embodiment of the invention.

The flow diagram of FIG. 4A describes the Power-Up State 2000 of the VF microcontroller program. After power up, the VF microcontroller initializes the SLIC and therefore, it assumes the primary handset and extension are on-hook 2010, and sets the SLIC open circuit voltage and short circuit current limit to 52 Vdc, and 30 mA respectively 2020. Once the SLIC VI characteristic has been initialized, the program exits the Power-Up State and enters the On-Hook Idle State 2030.

Figure 4B:
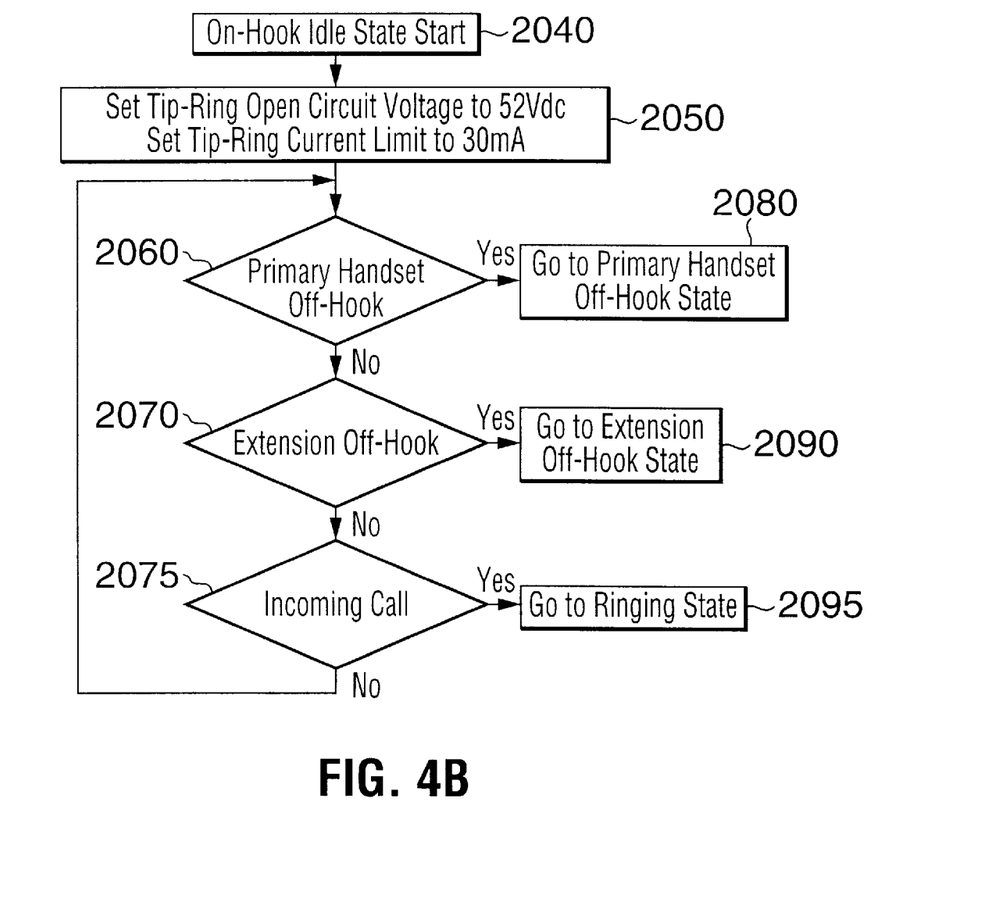

The flow diagram of FIG. 4B describes the On-Hook Idle State 2040, of the VF microcontroller program, where both the primary handset and extension are on-hook. In this state, the SLIC open circuit voltage, and short circuit current limit are set to 52 Vdc, and 30 mA respectively 2050. This VI characteristic makes the telephone subscriber line appear idle to the extensions connected to it. A SLIC open circuit voltage of 52 Vdc is preferred; however, other suitable voltages, for example between 22 Vdc and 80 Vdc, may be used. The SLIC short circuit current limit is not critical in this mode since the extension is not drawing current when it is on-hook and when a primary handset off-hook transition 2060, or an extension off-hook transition 2070 occurs, the program makes the appropriate state transition and sets the new SLIC values within 100 ms of reception of the debounced input. However, the SLIC short circuit current limit must be greater than the SLIC supervision circuit's minimum detect threshold so that the SLIC is able to detect an extension off-hook transition 2070. The program remains in the On-Hook Idle State until either a primary handset off-hook 2060, extension off-hook 2070, or an incoming call 2075 occurs. If a primary handset off-hook occurs 2060, for example, the user lifts the handset to place a call at the subscriber unit 1200, the program exits the On-Hook Idle State, and enters the Primary Handset Off-Hook State 2080. If an extension off-hook occurs 2070, for example, the user lifts the handset of an extension to place a call, the program exits the On-Hook Idle State, and enters the Extension Off-Hook State 2090. If an incoming call occurs 2075, for example, the subscriber unit 1200 receives an incoming call from the communications network 1000, the program exits the On-Hook Idle State, and enters the Ringing State 2095.

Figure 4C:
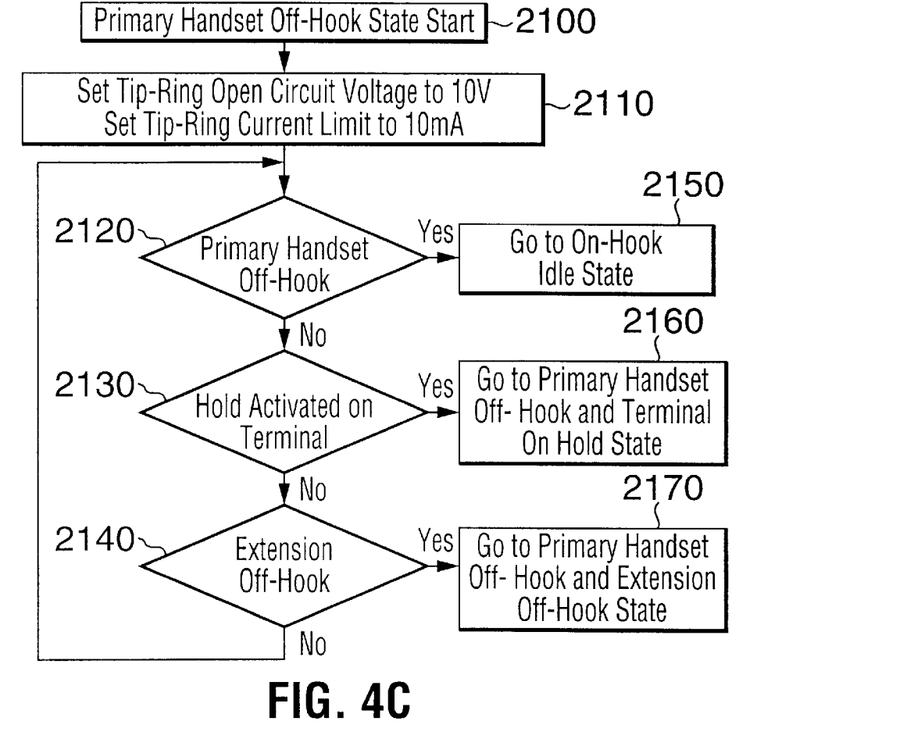

The flow diagram of FIG. 4C describes the Primary Handset Off-Hook State 2100, of the VF microcontroller program, where the primary handset is off-hook and extension is on-hook. In this state, the SLIC open circuit voltage, and short circuit current limit are set to 10 Vdc, and 10 mA respectively 2110. This change in VI characteristic of the telephone subscriber line makes the line appear in use to the extensions connected to it. For example, when the program moves from the On-Hook Idle State 2040, where the open circuit voltage is set to 52 Vdc 2050, to the Primary Handset Off-Hook State 2100, where the open circuit voltage is set to 10 Vdc 2110, due to the primary handset going off-hook 2060, 2100, the extension telephone sees its Tip to Ring voltage drop from 52 Vdc to 10 Vdc. A suitably equipped extension telephone interprets this drop in voltage as resulting from a second telephone connected to the same telephone subscriber line going off-hook. In other words the terminal simulates the changes in the VI characteristic of a telephone subscriber line resulting from an extension going off-hook by modifying the SLIC open circuit voltage when the primary handset goes off-hook. A SLIC open circuit voltage of 10 Vdc is preferred; however, other suitable voltages less than 15 Vdc may be used. Once again, the SLIC short circuit current limit is not critical in this mode since the extension is not drawing current when it is on-hook and when a primary handset on-hook transition 2120, Hold mode activation 2130, or an extension off-hook transition 2140 occurs, the program makes the appropriate state transition and sets the new SLIC values within 100 ms of reception of the debounced input. However, the SLIC short circuit current limit must be greater than the SLIC supervision circuit's minimum threshold so that the SLIC is able to detect an extension off-hook transition 2140. The program remains in the Primary Handset Off-Hook State until either a primary handset on-hook 2120, Hold mode activation 2130, or extension off-hook 2140 occurs. If a primary handset on-hook occurs 2120, for example, the user replaces the handset to terminate a call at the subscriber unit 1200, the program exits the Primary Handset Off-Hook State, and enters the On-Hook Idle State 2150. If Hold mode is activated on the terminal 2130, the program exits the Primary Handset Off-Hook State, and enters the Primary Handset Off-Hook and Terminal on Hold State 2160. If an extension off-hook occurs 2140, for example, the user lifts the handset of an extension to place a call or join in the conversation with the primary handset, the program exits the Primary Handset Off-Hook State, and enters the Primary Handset Off-Hook and Extension Off-Hook State 2170.

Figure 4D:
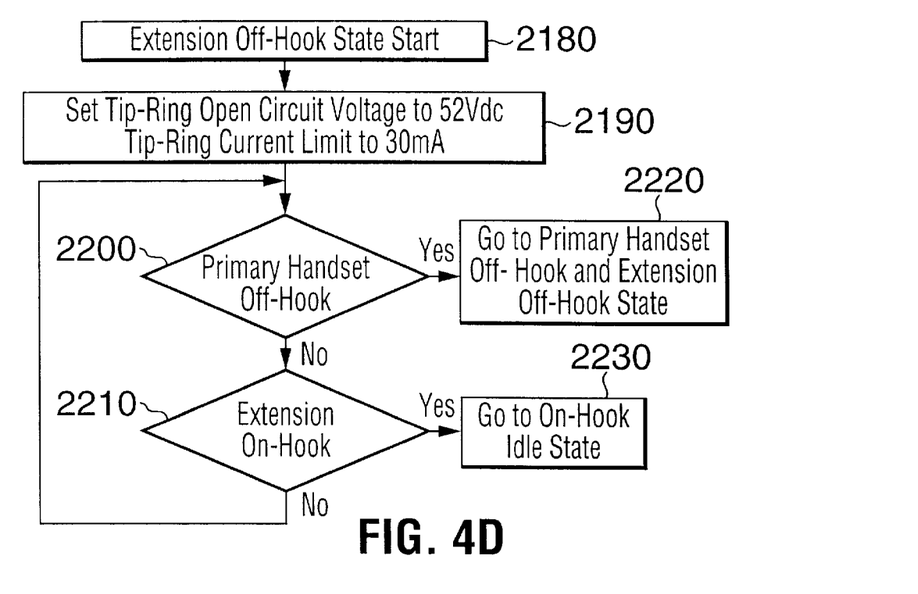

The flow diagram of FIG. 4D describes the Extension Off-Hook State 2180, of the VF microcontroller program, where the primary handset is on-hook and extension is off-hook. In this state, the SLIC open circuit voltage, and short circuit current limit are set to 52 Vdc, and 30 mA respectively 2190. The telephone subscriber line is in use due to the off-hook state of an extension connected to it. The SLIC open circuit voltage is not critical in this mode since the telephone subscriber line voltage is determined by the dc resistance of the off-hook extension and when a primary handset off-hook transition 2200, or an extension on-hook transition 2210 occurs, the program makes the appropriate state transition and sets the new SLIC values within 100 ms of reception of the debounced input. However, the SLIC open circuit voltage must be sufficient to generate at least 20 mA current into the off-hook extension with the transmit and receive audio signals superimposed on the dc current. A SLIC short circuit current limit of 30 mA is preferred; however a current limit greater than 20 mA and less than 100 mA may be used. The program remains in the Extension Off-Hook State until either a primary handset off-hook 2200 or an extension on-hook 2210 occurs. If a primary handset off-hook occurs 2200, for example, the user lifts the handset at the subscriber unit 1200 to place a call or join in the conversation with the extension, the program exits the Extension Off-Hook State, and enters the Primary Handset Off-Hook and Extension Off-Hook State 2220. If an extension on-hook occurs 2210, for example, the user replaces the handset of an extension to terminate a call, the program exits the Extension Off-Hook State, and enters the On-Hook Idle State 2230.

Figure 4E:
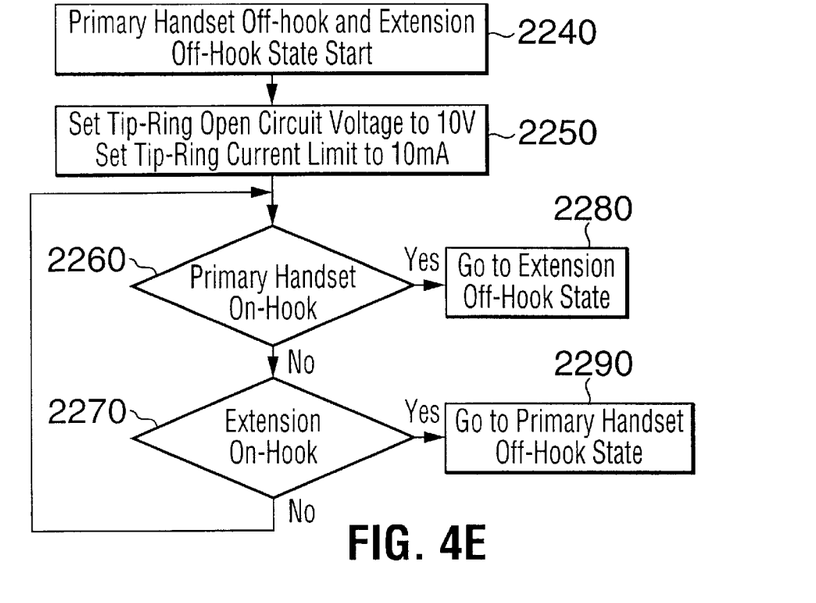

The flow diagram of FIG. 4E describes the Primary Handset Off-Hook and Extension Off-Hook State 2240, of the VF microcontroller program, where the primary handset is off-hook and extension is off-hook. In this state, the SLIC open circuit voltage, and short circuit current limit are set to 10 Vdc, and 10 mA respectively 2250. This change in VI characteristic of the telephone subscriber line makes the line appear in use with more than one extension off-hook to the extensions connected to it. For example, when the program moves from the Extension Off-Hook State 2180, where the current limit set to 30 mA 2190, to the Primary Handset Off-Hook and Extension Off-Hook State 2240, where the current limit is set to 10 mA 2250, due to the primary handset going off-hook 2200, 2240, the extension telephone sees its current drop from 30 mA to 10 mA. A suitably equipped extension telephone interprets this drop in current as a second telephone connected to the same telephone subscriber line going off-hook. The SLIC open circuit voltage is not critical in this mode since the telephone subscriber line voltage is determined by the dc resistance of the off-hook extension and when a primary handset on-hook transition 2260 or an extension on-hook transition 2270 occurs, the program makes the appropriate state transition and sets the new SLIC values within 100 ms of reception of the debounced input. However, the SLIC open circuit voltage must be sufficient to generate at least 10 mA current into the off-hook extension with the transmit and receive audio signals superimposed on the dc current. A SLIC short circuit current limit of 10 mA is preferred; however, a value which is half of the value used in the Extension Off-Hook state 2180 is suitable. The SLIC short circuit current limit must be greater than the SLIC supervision circuit's minimum detect threshold so that the SLIC is able to continue to detect the off-hook extension. The program remains in the Primary Handset Off-Hook and Extension Off-Hook State until either a primary handset on-hook 2260, or extension on-hook 2270 occur. If a primary handset on-hook 2260 occurs, for example, the user replaces the primary handset to terminate a call at the subscriber unit 1200 while an extension remains on the call, the program exits the Primary Handset Off-Hook and Extension Off-Hook State, and enters the Extension Off-Hook State 2280. If an extension on-hook occurs 2270, for example, the user replaces the handset of an extension to terminate a call at the extension while the subscriber unit 1200 remains on the call, the program exits the Primary Handset Off-Hook and Extension Off-Hook State, and enters the Primary Handset Off-Hook State 2290.

Figure 4F:
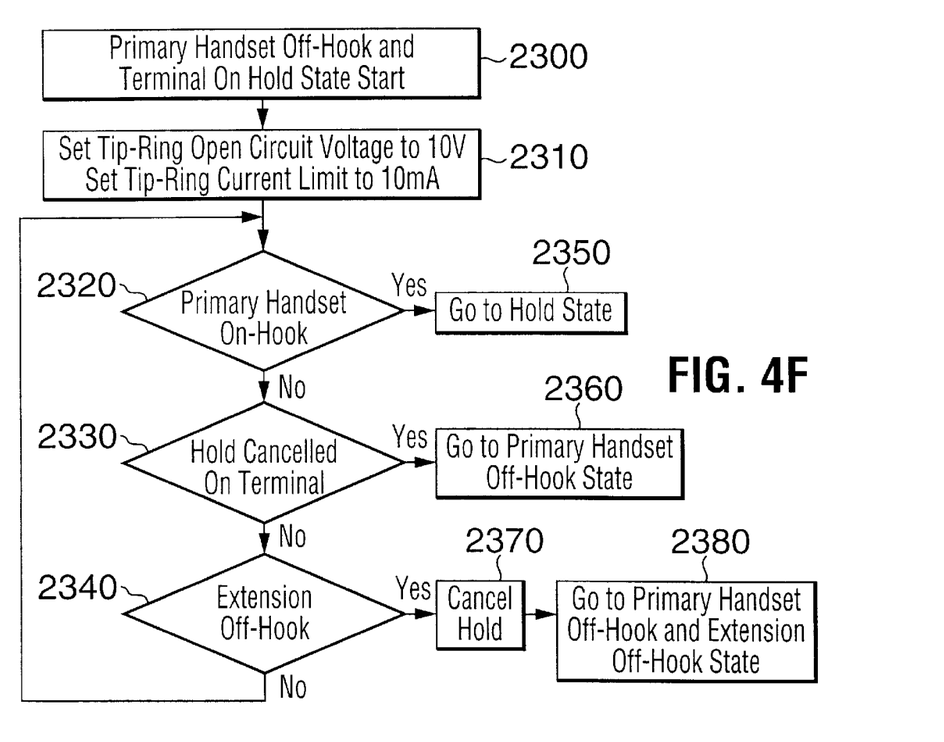

The flow diagram of FIG. 4F describes the Primary Handset Off-Hook and Terminal On Hold State 2300, of the VF microcontroller program, where the primary handset is off-hook and the terminal is on Hold. In this state, the SLIC open circuit voltage, and short circuit current limit are set to 10 Vdc, and 10 mA respectively 2310. This change in VI characteristic of the telephone subscriber line makes the line appear in use to the extensions connected to it. A SLIC open circuit voltage of 10 Vdc is preferred; however, other suitable voltages less than 15 Vdc may be used. The SLIC short circuit current limit is not critical in this mode since the extension is not drawing current when it is on-hook and when a primary handset on-hook transition 2320, Hold mode cancellation 2330, or an extension off-hook transition 2340 occurs, the program makes the appropriate state transition and sets the new SLIC values within 100 ms of reception of the debounced input. However, the SLIC short circuit current limit must be greater than the SLIC supervision circuit's minimum detect threshold so that the SLIC is able to detect an extension off-hook transition 2340. The program remains in the Primary Handset Off-Hook and Terminal On Hold State until either a primary handset on-hook 2320, Hold mode deactivation 2330, or extension off-hook 2340 occurs. If a primary handset on-hook occurs 2320, for example, the user replaces the primary handset to leave a call in Hold mode at the subscriber unit 1200, the program exits the Primary Handset Off-Hook and Terminal On Hold State, and enters the Hold State 2350. If Hold mode is cancelled 2330, the program exits the Primary Handset Off-Hook and Terminal On Hold State, and enters the Primary Handset Off-Hook State 2360. If an extension off-hook occurs 2340, for example, the user lifts the handset of an extension to release Hold while the subscriber unit 1200 remains on the call, the program cancels Hold 2370, exits the Primary Handset Off-Hook and Terminal on Hold State, and enters the Primary Handset Off-Hook and Extension Off-Hook State 2380.

Figure 4G:
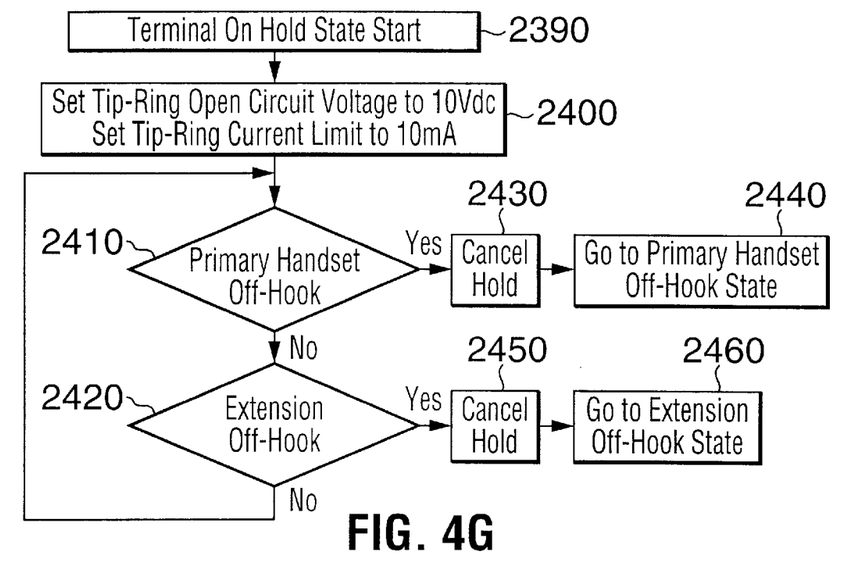

The flow diagram of FIG. 4G describes the Terminal On Hold State 2390, of the VF microcontroller program, where the primary handset is on-hook and the terminal is on Hold. In this state, the SLIC open circuit voltage, and short circuit current limit are set to 10 Vdc, and 10 mA respectively 2400. This change in VI characteristic of the telephone subscriber line makes the line appear in use to the extensions connected to it. A SLIC open circuit voltage of 10 Vdc is preferred; however, other suitable voltages less than 15 Vdc may be used. The SLIC short circuit current limit is not critical in this mode since the extension is not drawing current when it is on-hook and when a primary handset off-hook transition 2410, or an extension off-hook transition 2420 occurs, the program makes the appropriate state transition and sets the new SLIC values within 100 ms of reception of the debounced input. However, the SLIC short circuit current limit must be greater than the SLIC supervision circuit's minimum detect threshold so that the SLIC is able to detect an extension off-hook transition 2420. The program remains in the Terminal On Hold State until either a primary handset off-hook 2410, or extension off-hook 2420 occur,. If a primary handset off-hook occurs 2410, for example, the user lifts the primary handset to deactivate Hold mode at the subscriber unit 1200, the program cancels Hold 2430, exits the Terminal On Hold State, and enters the Primary Handset Off-Hook State 2440. If an extension off-hook occurs 2420, for example, the user lifts the handset of an extension to release Hold on the subscriber unit 1200 and continue the call on the extension, the program cancels Hold 2450, exits the Terminal on Hold State, and enters the Extension Off-Hook State 2460.

Figure 4H:
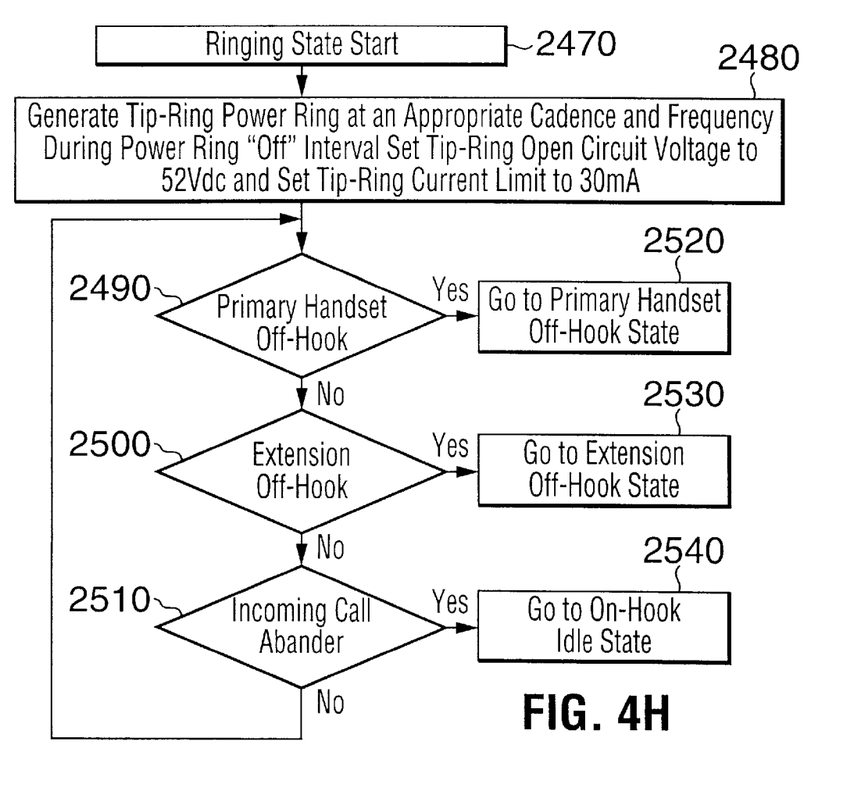

The flow diagram of FIG. 4H describes the Ringing State 2470, of the VF microcontroller program, where both the primary handset and extension are on-hook and the subscriber unit has received an incoming call from the communications network. In this state, the SLIC generates power ringing at an appropriate cadence and frequency and during the ringing off interval the SLIC open circuit voltage, and short circuit current limit are set to 52 Vdc, and 30 mA respectively 2480. The power ringing indicates to the extensions that there is an incoming call. The power ringing AC voltage may or may not be superimposed on a DC voltage. During the ringing off interval a SLIC open circuit voltage of 52 Vdc is preferred; however, other suitable voltages, for example between 22 Vdc and 80 Vdc, may be used. The SLIC short circuit current limit is not critical during the ringing off interval since the extension is not drawing current when it is on-hook and when a primary handset off-hook transition 2490, an extension off-hook transition 2500, or an incoming call abandon 2510 occurs, the program makes the appropriate state transition and sets the new SLIC values within 100 ms of reception of the debounced input. However, the SLIC short circuit current limit must be greater than the SLIC supervision circuit's minimum detect threshold so that the SLIC is able to detect an extension off-hook transition 2500. The program remains in the Ringing State until either a primary handset off-hook 2490, an extension off-hook 2500, or an incoming call abandon 2510 occurs. If a primary handset off-hook occurs 2490, for example, the user lifts the handset to receive a call at the subscriber unit 1200, the program exits the Ringing State, and enters the Primary Handset Off-Hook State 2520. If an extension off-hook occurs 2500, for example, the user lifts the handset of an extension to receive a call, the program exits the Ringing State, and enters the Extension Off-Hook State 2530. If an incoming call abandon occurs 2510, for example, the communications network 1000 stops trying to call the subscriber unit 1200, the program exits the Ringing State, and enters the On-Hook Idle State 2540.

The circuit diagram of FIG. 5 is an appropriate SLIC and VF microcontroller implementation. The SLIC is primarily implemented with an Advanced Micro Devices (AMD) SLIC chip, AM79R79 3000 which drives the Tip 3022, and Ring 3024 terminals of the RJ-11 jack 3020 differentially through 51.1 ohm resistors 3030, 3040. The other elements connected in series with Tip 3022 or Ring 3024, or connected between Tip 3020 or Ring 3024 and the circuit ground 3090, required for over voltage protection or Electro-Magnetic Interference (EMI) filtering and so on, are not included in this description. All power supplies are referenced to the circuit ground 3090, which may or may not be connected to earth ground. The high voltage portion of the SLIC chip 3000 is powered by −75 Vdc 3050, and −28 Vdc 3070 through diodes 3060 and 3080. The power supply used by the SLIC chip 3000 is determined by the status of input pin B2EN 3160. Two power supplies are used in order to provide high voltage when the SLIC chip is on-hook, and provide low voltage, in order to reduce power dissipation, when the SLIC is off-hook. The low voltage portion of the SLIC chip 3000 is powered by +5 Vdc 3100, and −28 Vdc 3070 where an internal negative regulator connected to pin 22 (VNEG) derives −5 Vdc. Capacitors 3110, 3120, and 3130 filter the SLIC chip 3000 power supply. The VF microcontroller 3010, implemented with a Mitsubishi M37510, adjusts the telephone subscriber line's VI characteristics by controlling the SLIC chip 3000 inputs 3160, 3170, 3180, and 3190, as well as the external circuit 3200, 3210 in response to the status of the primary handset hook switch 3230, the "Hold" key 3240, and the SLIC supervision output 3220. Outputs 3170, 3180, and 3190 may be set to low, high, and low respectively at all times in this embodiment other than during the generation of power ringing. This setting puts the SLIC chip 3000 into an active mode. It should be appreciated by a person skilled in the art that other SLIC modes may be used. For example, standby may be used to conserve power On-Hook Idle State, step 2050 (FIG. 4B). The VF microcontroller 3010 uses general purpose input/output configured as outputs for the SLIC controls 3160, 3170, 3180, 3190, 3200, and 3210. The hook switch input 3230 uses an internal pull-up. The "Hold" key 3240 is scanned by the keyscan algorithm, where Port 1 is used for the rows, and Port 2 is used for the columns. In this example, the "Hold" key 3240 is located at row 0 column 0. Transistors 3280, 3320, 3350, and 3380 are operated as switches, controlled by VF microcontroller 3010 outputs 3200 and 3210, where they are either "off" when only leakage current flows between the collector and emitter junctions, or "on" when the collector emitter voltage is saturated. The value of resistors 3300, 3310, 3330, 3340, 3360, and 3390 are not critical. 1 Meg ohm ensures the transistors are saturated while on, but does not waste power. The external circuit comprised of transistors 3280, 3320, and 3350, and 1 Meg ohm resistors 3300, 3310, 3330, 3340, and 3360 is required to provide level translation from the +5 Vdc supply used by VF microcontroller 3010 and the negative voltages which appear on node 4100 when the SLIC chip 3000 is in active mode as determined by inputs 3170, 3180, and 3190.

0 ohm resistor 3140 sets the Tip 3022 to Ring 3024 open circuit voltage to 55 Vdc when operated from −75 Vdc 3050. 1 Meg ohm resistor 3150 sets the Tip 3022 to Ring 3024 open circuit voltage to 17 Vdc when operated from −28 Vdc 3070. The power supply used by the SLIC chip 3000 is determined by the status of input pin B2EN 3160. In addition, when VF microcontroller output 3210 is low, PNP transistor 3380 is saturated on and current, as determined by the value of resistor 3370, is injected into node 4000. Injection of current into node 4000 reduces the Tip 3022 to Ring 3024 open circuit voltage when the SLIC chip 3000 is in active mode as determined by inputs 3170, 3180, and 3190.

The resistance between nodes 4000 and 4100 set the Tip 3022 to Ring 3024 short circuit current limit. Two values of resistance are available. When VF microcontroller output 3200 is high, transistor 3280 is off and the resistance is comprised of resistor 3250 in series with resistor 3260. When VF microcontroller output is low, transistor 3280 is saturated on and the resistance is comprised of resistor 3250 in series with the parallel combination of resistors 3260 and 3270. The time constant of the current limit is set by capacitor 3290. In this case 1 uF is suitable.

The SLIC circuit inputs 3160, 3200, and 3210, are set to high, low, and high respectively in FIG. 4A, Power-Up State, step 2020, and FIG. 4B, On-Hook Idle State, step 2050, and FIG. 4H Ringing State, step 2480 during the ring off interval. The Tip 3022 to Ring 3024 open circuit voltage is 55 Vdc. The Tip 3022 to Ring 3024 short circuit current limit is 30 mA when resistors 3250, 3260, and 3270 are 43.2 K ohm, 200 K ohm, and 51.1 K ohm respectively.

The SLIC circuit inputs 3160, 3200, and 3210, are set to low, low, and low respectively in FIG. 4C, Primary Handset Off-Hook State, step 2110, FIG. 4F, Primary Handset Off-Hook and Terminal On Hold State, step 2310, and FIG. 4G, Terminal On Hold State, step 2400. The Tip 3022 to Ring 3024 open circuit voltage is 14.5 Vdc when resistor 3370 is 221 K ohm. The Tip 3022 to Ring 3024 short circuit current limit is 7 mA when resistors 3250, 3260, 3270, and 3370 are 43.2 K ohm, 200 K ohm, 51.1 K ohm, and 221 K ohm respectively.

The SLIC circuit inputs 3160, 3200, and 3210, are set to low, low, and high respectively in FIG. 4D, Extension Off-Hook State. The Tip 3022 to Ring 3024 open circuit voltage is 17 Vdc. The Tip 3022 to Ring 3024 short circuit current limit is 30 mA when resistors 3250, 3260, and 3270 are 43.2 K ohm, 200 K ohm, and 51.1 K ohm respectively.

The SLIC circuit inputs 3160, 3200, and 3210, are set to low, high, and high respectively in FIG. 4E, Primary Handset Off-Hook and Extension Off-Hook State. The Tip 3022 to Ring 3024 open circuit voltage is 17 Vdc. The Tip 3022 to Ring 3024 short circuit current limit is 10 mA when resistors 3250, and 3260 are 43.2 K ohm, and 200 K ohm, respectively.

Furthermore, a person skilled in the art should note that although the current limit produced by the SLIC is adjusted when a extension device goes off-hook, based on the type of SLIC chip used, other circuitry could be used to control the voltage directly. However, in the preferred embodiment described, it is preferred to control the current limit when the extension is off-hook and the voltage across the tip and ring terminal when an extension is on-hook. Also, although the above has been described with respect to simulating the primary handset to behave as if it was on the telephone subscriber line, other conditions can prompt the microcontroller to control the SLIC in order to generate the change in voltage and/or current limit on the telephone subscriber line. For example, the subscriber unit 1200 can in certain circumstances enter into a test mode, possibly at the request of the network via communication interface 1210. In this circumstance, if the condition occurs, then the SLIC tip to ring voltage, for example, is reduced in order to provide an indication to the extension telephones that the line is in use, in order to deter a user of one of the extension telephones from initiating a call during such a test.

As another feature reader should note that as well as simulating changes of the VI characteristic the subscriber line, the SU can also detect such changes. For example, if an extension telephone goes off-hook, the SLIC will detect this. The microcontroller can then suitably indicate to a potential user of the primary handset, that the line is in use (e.g. message on display or by activating light of the indicator).

It should be appreciated by a person skilled in the art that there are many ways of accomplishing the above described simulation. For example, the SLIC circuit 210 can include a SLIC chip which is fully programmable with respect to the voltage and current characteristics generated by the SLIC via a serial or parallel interface. The power supply voltage of the SLIC could be controlled to modify the tip to ring voltage. An external current limit circuit in series with tip or ring could be used to modify the SLIC short circuit current limit. A load could be switched in across tip and ring in order to modify the open circuit voltage or short circuit current limit. A logic circuit could be used in place of the VF microcontroller.

Numerous modifications, variations and adaptations may be made to the particular embodiments of the invention described above without departing from the scope of the invention, which is defined in the claims.

I claim:

1. A subscriber unit for providing telephony services to telephony devices on a telephone line coupled to said subscriber unit, said subscriber unit comprising:

at least one communication interface for communicating with a communications network via a suitable medium;

a primary handset directly interacting with a controller;

a subscriber line interface circuit (SLIC);

at least one jack for coupling said telephone line to said SLIC;

means for altering the direct current (dc) voltage and current limit (VI characteristics) of said telephone line in response to a condition under control of the controller.

2. A subscriber unit for providing telephony services to telephony devices on a telephone line coupled to said subscriber unit, said subscriber unit comprising:

at least one communication interface for communicating with a communications network via a suitable medium, a subscriber line interface circuit (SLIC);

at least one jack for coupling said telephone line to said SLIC;

an integrated primary handset not connected to said at least one jack;

means for altering the direct current (dc) voltage and current limit (VI characteristics) of said telephone line in response to a condition; and a controller for detecting said condition and controlling said means for altering;

wherein said condition includes the status of said primary handset.

3. A subscriber unit as claimed in claim 2 further comprising:
a hook switch connected to said controller and wherein said condition includes the status of said hook switch.

4. A subscriber unit as claimed in claim 3 wherein said means for altering further comprises:
means for varying the voltage on the telephone line when all of said devices are on-hook; and
means for varying the current limit supplied to said telephone line by said SLIC in response to any of said devices going off-hook.

5. A subscriber unit as claimed in claim 4 wherein said at least one communication interface comprises a radio transceiver.

6. A method for simulating changes in the direct current (dc) voltage and current limit (VI characteristics) of a telephone line connected to a subscriber unit, said unit having a controller for directly interacting with a primary handset, and a telephone subscriber line interface, said method comprising the steps of:
maintaining an open circuit voltage between tip and ring terminals of said telephone subscriber unit when said subscriber unit is in an on-hook idle state;
detecting a change in hook status of said primary handset and of an extension set connected to said telephone line;
said controller regulating the voltage and current limit on said telephone line in response to a change in hook status of either said primary handset or said extension set.

7. A method for simulating changes in the direct current (dc) voltage and current limit (VI characteristics) of a telephone line connected to a subscriber unit, said unit having a communications interface for communicating with a communications network, controller for directly interacting with a primary handset, and a subscriber line interface, said method comprising the steps of:
maintaining an open circuit voltage between the tip and ring terminals of said telephone subscriber unit when said subscriber unit is in an on-hook idle state;
detecting a condition;
said controller regulating the dc voltage and current limit on said telephone line in response to the condition detected, wherein said condition includes the status of said subscriber unit.

8. The method as claimed in claim 7 wherein said condition comprises:
a device hook status changes; and
the primary handset hook status changes.

9. The method as claimed in claim 8 wherein said regulating step comprises:
a) while said primary handset is on-hook, supplying a first set of VI characteristics to said telephone line; and
b) while said primary handset is off-hook, providing a second set of VI characteristics to said telephone line.

10. The method as claimed in claim 9 wherein said first set of characteristics includes supplying:
a VI characteristic which an extension set connected to said telephone line interprets as a telephone line idle condition when all extension sets are on hook and
a VI characteristic which an extension set connected to said telephone line interprets as an extension in use when an extension is off hook; and
wherein said second set of characteristics includes supplying;

a VI characteristic which an extension set connected to said telephone line interprets as an extension in use when all extension sets are on hook and
a VI characteristic which an off-hook extension set connected to said telephone line interprets as an extension in use.

11. The method as claimed in claim 9 wherein said first set of characteristics includes:
i) supplying an open circuit voltage between 22 Vdc and 80 Vdc when all extension sets are on-hook and
ii) supplying a current limit between 20 mA and 100 mA when an extension set is off-hook; and
wherein said second set of characteristics includes:
iii) supplying an open circuit voltage less than 15 Vdc when all extension sets are on-hook and
iv) supplying a current limit that is half of the current limit supplied in (ii).

12. The method as claimed in claim 8 wherein said condition further includes:
the extension hold mode status changes;
the primary handset hold mode status changes; and
the subscriber unit enters into a test mode.

13. A subscriber unit comprising:
at least one communication interface for communicating with a communications network via a suitable medium;
a primary handset;
a subscriber line interface circuit (SLIC);
at least one jack coupling a telephone line to said SLIC, said jack including tip and ring terminals;
a controller for directly interacting with said primary handset and adapted to carry out the steps of:
maintaining an open circuit voltage between the tip and ring terminals of said telephone subscriber unit when said subscriber unit is in an on-hook idle state;
detecting a change in hook status of said primary handset and of an extension set connected to said telephone line;
regulating the voltage and current limit on said telephone line in response to a change in hook status of either said primary handset or said extension set.

14. A subscriber unit comprising:
at least one communication interface for communicating with a communications network via a suitable medium;
a primary handset;
a subscriber line interface circuit (SLIC);
at least one jack coupling a telephone line to said SLIC, said jack including tip and ring terminals;
a controller for directly interacting with said primary handset and adapted to carry out the steps of:
maintaining an open circuit voltage between the tip and ring terminals of said telephone subscriber unit when said subscriber unit is in an on-hook idle state;
detecting a condition;
regulating the dc voltage and current limit on said telephone line in response to the condition detected, wherein said condition includes the status of said subscriber unit.

15. The subscriber unit as claimed in claim 14 wherein said condition includes:
a device hook status changes, and
the primary handset hook status changes; and wherein said controller is adapted to carry out said regulating step by:

a) while said primary handset is on-hook, supplying a first set of VI characteristics to said telephone line; and b) while said primary handset is off-hook, providing a second set of VI characteristics to said telephone line.

16. The subscriber unit as claimed in claim 15 wherein said first set of characteristics includes supplying:

a VI characteristic which an extension set connected to said telephone line interprets as a telephone line idle condition when all extension sets are on hook and a VI characteristic which an extension set connected to said telephone line interprets as an extension in use when an extension is off hook; and wherein said second set of characteristics includes supplying:

a VI characteristic which an extension set connected to said telephone line interprets as an extension in use when all extension sets are on hook and a VI characteristic which an off-hook extension set connected to said telephone line interprets as an extension in use.

17. The subscriber unit as claimed in claim 15 wherein said first set of characteristics includes:

i) supplying an open circuit voltage between 22 Vdc and 80 Vdc when all extension sets are on-hook and ii) supplying a current limit between 20 mA and 100 mA when an extension set is off-hook; and wherein said second set of characteristics includes:

iii) supplying an open circuit voltage less than 15 Vdc when all extension sets are on-hook and iv) supplying a current limit that is half of the current limit supplied in (ii).

18. A subscriber unit comprising:

a primary handset directly interacting with a controller;

means for communicating with a communications network via a suitable medium;

a subscriber line interface circuit (SLIC);

means for coupling a telephone line to said SLIC, said means for coupling including tip and ring terminals;

means for maintaining an open circuit voltage between the tip and ring terminals of said telephone subscriber unit when said primary handset is in an on-hook idle state;

means for detecting a change in hook status of said primary handset and of an extension set connected to said telephone line; and means for regulating, under the control of said controller, the direct current (dc) voltage and current limit on said telephone line in response to a change in hook status of either said primary handset or said extension set.

19. A subscriber unit comprising:

means for communicating with a communications network via a suitable medium;

a primary handset directly interacting with a controller;

a subscriber line interface circuit (SLIC);

means for coupling a telephone line to said SLIC, said means for coupling including tip and ring terminals;

means for maintaining an open circuit voltage between the tip and ring terminals of said telephone subscriber unit when said primary handset is in an on-hook idle state;

means for detecting a condition; and means for regulating, under the control of said controller, the voltage and current limit on said telephone line in response to the condition detected.

20. The subscriber unit as claimed in claim 19 wherein said condition includes any of:

an extension hook status changes;

a primary handset hook status changes;

an extension hold mode status changes;

a primary handset hold mode status changes; and the subscriber unit enters into a test mode.

21. A subscriber unit comprising:

means for communicating with a communications network via a suitable medium;

a subscriber line interface circuit (SLIC);

means for coupling a telephone line to said SLIC;

an integrated primary handset;

a controller for controlling said SLIC to supply a first set of voltage and current (VI) characteristics to said telephone line while said primary handset is on-hook and to supply a second set of VI characteristics to said telephone line while said primary handset is off-hook.

22. A subscriber unit as claimed in claim 21 further comprising:

first means for supplying a VI characteristic which an extension set connected to said telephone line interprets as a telephone line idle condition when all extension sets are on hook; and second means for supplying a VI characteristic which an extension set connected to said telephone line interprets as an extension in use when an extension is off hook; and wherein said means for supplying a VI second set of VI characteristics includes:

third means for supplying a characteristic which an extension set connected to said telephone line interprets as an extension in use when all extension sets are on-hook; and fourth means for supplying a VI characteristic which an off-hook extension set connected to said telephone line interprets as an extension in use.

23. A subscriber unit as claimed in claim 22 wherein:

said first means includes means for supplying an open circuit voltage between 22 Vdc and 80 Vdc when all extension sets are on-hook;

said second means includes means for supplying a current limit between 20 mA and 100 mA when an extension set is off-hook;

said third means includes means for supplying an open circuit voltage less than 15 Vdc when all extension sets are on-hook; and said fourth means includes means for supplying a current limit approximately fifty per cent of the current limit supplied by said second means.

* * * * *